(12) United States Patent
Zhang et al.

(10) Patent No.: US 12,412,178 B2
(45) Date of Patent: Sep. 9, 2025

(54) FACE RECOGNITION METHOD, APPARATUS, ELECTRONIC DEVICE, AND STORAGE MEDIUM

(71) Applicant: Tencent Technology (Shenzhen) Company Limited, Guangdong (CN)

(72) Inventors: Hao Zhang, Shenzhen (CN); Jiaxin Gu, Shenzhen (CN); Pengcheng Shen, Shenzhen (CN); Shaoxin Li, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 329 days.

(21) Appl. No.: 18/305,644

(22) Filed: Apr. 24, 2023

(65) Prior Publication Data
US 2023/0316278 A1 Oct. 5, 2023

Related U.S. Application Data
(63) Continuation of application No. PCT/CN2022/095519, filed on May 27, 2022.

(30) Foreign Application Priority Data
Jun. 21, 2021 (CN) .......................... 202110686520.2

(51) Int. Cl.
G06Q 20/40 (2012.01)
G06V 40/16 (2022.01)

(52) U.S. Cl.
CPC ..... G06Q 20/40145 (2013.01); G06V 40/168 (2022.01); G06V 40/172 (2022.01)

(58) Field of Classification Search
CPC ......... G06Q 20/40145; G06Q 20/4014; G06V 40/168; G06V 40/172; G06F 18/253; G06F 18/2323; G06F 16/583
See application file for complete search history.

(56) References Cited

U.S. PATENT DOCUMENTS

2015/0310259 A1* 10/2015 Lau ....................... G06V 40/169
382/118
2017/0323299 A1* 11/2017 Davis ................... G06Q 20/204

FOREIGN PATENT DOCUMENTS

CN 107705128 A 2/2018
CN 110298667 A 10/2019
(Continued)

OTHER PUBLICATIONS

Office Action issued in Chinese Patent Application No. 202110686520.2 dated Dec. 4, 2024, w/English translation, 12 pages.
(Continued)

*Primary Examiner* — Wassim Mahrouka
(74) *Attorney, Agent, or Firm* — Crowell & Moring LLP

(57) ABSTRACT

Embodiments of this application disclose a face recognition method and apparatus, an electronic device and a storage medium. The embodiments of this application can obtain a face image feature of a resource transfer object and a device identification of a resource transfer device; search for a target face feature matching the face image feature, and determine a target object corresponding to the target face feature; search for a resource transfer device graph feature corresponding to the device identification and a target object graph feature corresponding to the target object; determine an initial resource transfer probability that the target object performs resource transfer at the resource transfer place; generate a fused resource transfer probability according to a similarity between the face image feature and the target face feature and the initial resource transfer probability; and determine a resource transfer verification manner of the resource transfer object.

20 Claims, 7 Drawing Sheets

(56) References Cited

FOREIGN PATENT DOCUMENTS

| | | | |
|---|---|---|---|
| CN | 110458564 A | 11/2019 |
| CN | 111126346 A | 5/2020 |
| CN | 111291125 A | 6/2020 |
| CN | 111382410 A | 7/2020 |
| CN | 111461695 A | 7/2020 |
| CN | 111625793 A | 9/2020 |
| CN | 111652331 A | 9/2020 |
| CN | 111915305 A | 11/2020 |
| CN | 112989937 A | 6/2021 |
| EP | 2 902 950 A1 | 8/2015 |

OTHER PUBLICATIONS

International Search Report for priority application no. PCT/CN2022/095519 dated Aug. 11, 2022, 4p, in English and Chinese languages.
International Search Report and Written Opinion for priority application No. PCT/CN2022/095519 date d Aug. 11, 2022, 8p, in Chinese language.
Concise explanation of relevancy.

* cited by examiner

FACE RECOGNITION METHOD, APPARATUS, ELECTRONIC DEVICE, AND STORAGE MEDIUM

RELATED APPLICATION

This application is a continuation application of International Patent Application No. PCT/CN2022/095519, filed on May 27, 2022, which claims the priority of Chinese Patent Application No. 202110686520.2, filed on Jun. 21, 2021 with the China National Intellectual Property Administration and entitled "FACE RECOGNITION METHOD AND APPARATUS, ELECTRONIC DEVICE AND STORAGE MEDIUM." Both of the applications are incorporated herein by reference in their entireties.

TECHNICAL FIELD

This application relates to the technical field of computers, and particularly relates to a face recognition method and apparatus, an electronic device and a storage medium.

BACKGROUND

In recent years, authentication technologies such as fingerprint recognition, eye pattern recognition, iris recognition, and face recognition have been greatly developed. The face recognition technology is the most prominent, which has been more and more widely used in various types of identity authentication systems. With the vigorous development of the face recognition technology, face scan payment has developed more and more rapidly.

SUMMARY

An embodiment of this application provides a face recognition method, including:
  obtaining a request that is initiated at a resource transfer place and contains resource transfer information, the resource transfer information comprising a face image feature of a resource transfer object and a device identification of a resource transfer device;
  searching for a target face feature matching the face image feature from a face database, a target object corresponding to the target face feature;
  searching, from a graph feature database, for a resource transfer device graph feature and a target object graph feature, the resource transfer device graph feature corresponding to the device identification and the target object graph feature corresponding to the target object;
  determining, according to the resource transfer device graph feature and the target object graph feature, an initial resource transfer probability of the target object performing resource transfer at the resource transfer place;
  generating a fused resource transfer probability according to the initial resource transfer probability and a similarity between the face image feature and the target face feature; and
  determining a resource transfer verification manner of the resource transfer object according to the fused resource transfer probability.

Correspondingly, an embodiment of this application also provides a face recognition apparatus, including:
  an acquisition unit, configured to obtain a request that is initiated at a resource transfer place and contains resource transfer information, the resource transfer information including a face image feature of a resource transfer object and a device identification of a resource transfer device;
  a matching unit, configured to search for a target face feature matching the face image feature from a face database, and determine a target object corresponding to the target face feature;
  a search unit, configured to search, from a graph feature database, for a resource transfer device graph feature corresponding to the device identification and a target object graph feature corresponding to the target object;
  a calculation unit, configured to determine, according to the resource transfer device graph feature and the target object graph feature, an initial resource transfer probability that the target object performs resource transfer at the resource transfer place;
  a fusion unit, configured to generate a fused resource transfer probability according to a similarity between the face image feature and the target face feature and the initial resource transfer probability; and
  a recognition unit, configured to determine a resource transfer verification manner of the resource transfer object according to the fused resource transfer probability.

In addition, an embodiment of this application further provides a non-transitory computer-readable storage medium, storing a plurality of instructions adapted to be loaded by a processor to perform steps comprising:
  obtaining a request that is initiated at a resource transfer place and contains resource transfer information, the resource transfer information comprising a face image feature of a resource transfer object and a device identification of a resource transfer device;
  searching for a target face feature matching the face image feature from a face database, a target object corresponding to the target face feature;
  searching, from a graph feature database, for a resource transfer device graph feature and a target object graph feature, the resource transfer device graph feature corresponding to the device identification and the target object graph feature corresponding to the target object;
  determining, according to the resource transfer device graph feature and the target object graph feature, an initial resource transfer probability of the target object performing resource transfer at the resource transfer place;
  generating a fused resource transfer probability according to the initial resource transfer probability and a similarity between the face image feature and the target face feature; and
  determining a resource transfer verification manner of the resource transfer object according to the fused resource transfer probability.

In addition, an embodiment of this application further provides an electronic device, including a memory, a processor and a computer program stored on the memory and executable on the processor, the processor, when executing the program, implementing the steps including:
  obtaining a request that is initiated at a resource transfer place and contains resource transfer information, the resource transfer information comprising a face image feature of a resource transfer object and a device identification of a resource transfer device;
  searching for a target face feature matching the face image feature from a face database, a target object corresponding to the target face feature;

searching, from a graph feature database, for a resource transfer device graph feature and a target object graph feature, the resource transfer device graph feature corresponding to the device identification and the target object graph feature corresponding to the target object;

determining, according to the resource transfer device graph feature and the target object graph feature, an initial resource transfer probability of the target object performing resource transfer at the resource transfer place;

generating a fused resource transfer probability according to the initial resource transfer probability and a similarity between the face image feature and the target face feature; and determining a resource transfer verification manner of the resource transfer object according to the fused resource transfer probability.

In addition, an embodiment of this application further provides a computer program product or a computer program, including computer instructions stored in a computer-readable storage medium, a processor of a computer device reading the computer instructions from the computer-readable storage medium, and the processor executing the computer instructions to cause the computer device to perform the steps of any face recognition method provided by the embodiments of this application.

BRIEF DESCRIPTION OF THE DRAWINGS

In order to illustrate the technical solutions in the embodiments of this application more clearly, the following briefly introduces the accompanying drawings required in the description of the embodiments. Obviously, the accompanying drawings described below are only some embodiments of this application. Those of ordinary skill in the art can also obtain other drawings according to the drawings without any creative work.

DESCRIPTION OF EMBODIMENTS

Figure 1A:
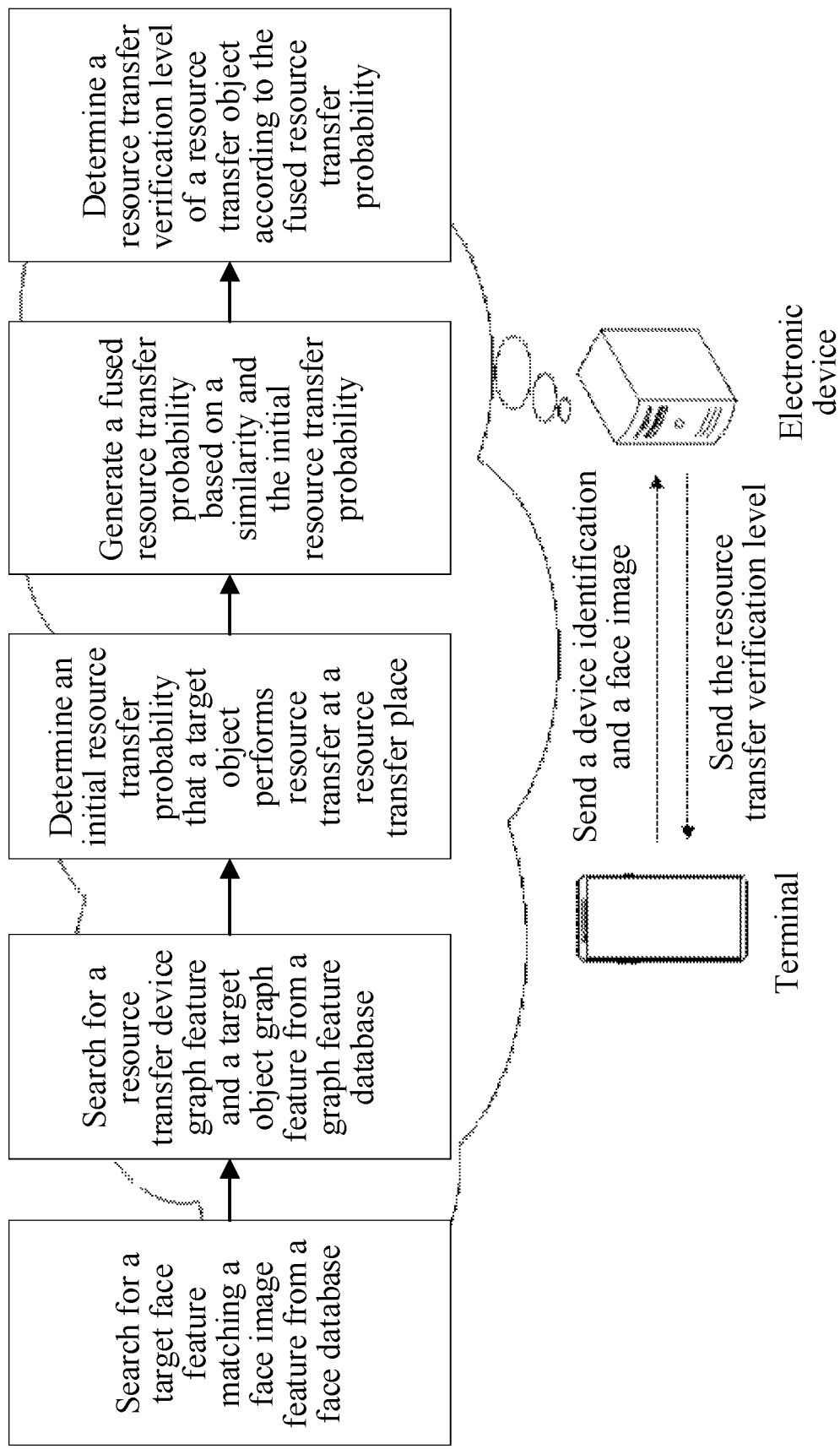
FIG. 1a is a schematic diagram of a scenario of a face recognition method provided by an embodiment of this application.

The technical solutions in embodiments of this application are clearly and completely described in the following with reference to the accompanying drawings in the embodiments of this application. Apparently, the described embodiments are merely some rather than all of the embodiments of this application. According to the embodiments in this application, all other embodiments obtained by those skilled in the art without creative work all fall within the protection scope of this application.

The principles of this application are illustrated as being implemented in a suitable computing environment. In the following description, the specific embodiments of this application are described with reference to steps and symbols of operations that are performed by one or more computers, unless indicated otherwise. Therefore, these steps and operations will be referred to several times as being performed by a computer, which as referred to herein includes operations performed by a computer processing unit that is an electronic signal representing data in a structured form. This operation transforms the data or maintains it at a position in a memory system of the computer, which may reconfigure or otherwise alter the operation of the computer in a manner well known to those skilled in the art. Data structures in which the data is maintained are physical locations of the memory that have particular properties defined by the format of the data. However, the principles of this application are described in the foregoing text and are not meant to be a limitation as those skilled in the art will recognize that the various steps and operations described below may also be implemented in hardware.

As used herein, the term "unit" may be viewed as a software object executed on the computing system. The various components, units, engines, and services described herein may be viewed as implementation objects on the computing system. However, it falls within the scope of this application that the apparatus and method described herein can be implemented in software or, of course, hardware.

In this application, the terms "first", "second", "third", and the like are intended to distinguish between different objects but do not indicate a particular order. Furthermore, the terms "include", "have", and any variations thereof are intended to cover a non-exclusive inclusion. For example, a process, a method, a system, a product, or a device that includes a series of steps or units is not limited to the listed steps or units, but some embodiments further include an unlisted step or unit, or some embodiments further include another inherent step or unit of the process, the method, the product, or the device.

Embodiment mentioned in the specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

Embodiments of this application provide a face recognition method and apparatus, an electronic device and a storage medium. The face recognition apparatus can be integrated in an electronic device. The electronic device may be a server, a terminal, or the like.

The face recognition method provided by an embodiment of this application relates to a computer vision technology, a natural language processing technology and a machine learning technology in the field of artificial intelligence. The computer vision technology of artificial intelligence can be used to perform feature extraction on a face image; the machine learning can be used to perform feature learning according to a relation between a user and a device; and the natural language processing technology can be used to extract a relation between a resource transfer object and a resource transfer device, so as to determine a resource transfer verification manner for a resource transfer object.

In general, face scan payment is defined as an image recognition technology. However, if the face scan payment only depends on the image recognition technology, a problem in face recognition for similar faces and highly similar faces such as twins' faces cannot be solved, which reduces accuracy of face recognition, so that accuracy of determining a user's payment verification manner is low. In addition, a face scan technology cannot be continuously improved during use, which affects an experience of the face scan.

Therefore, an embodiment of this application provides a face recognition method. Resource transfer may be transferring a resource from one party to another party at a resource transfer place. For example, a user pays a resource to a merchant at a place of payment. The resource transfer place is also referred to as a place of payment, and may be, for example, a mall, supermarket, etc. As shown in FIG. 1a, first, an electronic device integrated with a face recognition apparatus can obtain resource transfer information initiated at a resource transfer place. The resource transfer information includes a face image feature of a resource transfer object and a device identification of a resource transfer device; then the electronic device integrated with the face recognition apparatus can search for a target face feature matching the face image feature from a face database, and determine a target object corresponding to the target face feature; it can search, from a graph feature database, for a resource transfer device graph feature corresponding to the device identification and a target object graph feature corresponding to the target object; it can calculate, according to the resource transfer device graph feature and the target object graph feature, an initial resource transfer probability that the target object performs resource transfer at the resource transfer place, and generate a fused resource transfer probability according to a similarity between the face image feature and the target face feature and the initial resource transfer probability; it can recognize a resource transfer verification manner of the resource transfer object according to the fused resource transfer probability. By making full use of the information about resource transfer between an object and a device in a historical resource transfer record, (the face image feature of the resource transfer object and the device identification of the resource transfer device in the historical record of resource transfer performed through face recognition), constructing a heterogeneous network graph of the object and the device, and fully mining structure information of the object and the device in the heterogeneous network graph, this scheme can achieve a similar effect of collaborative filtering. Finally, a graph model constructs a probability that the object uses the device to perform the resource transfer or a transfer probability between the object and the device through measurements of the object features and the device features. Finally, a comprehensive decision is made by combining the face recognition technology in the face recognition apparatus to increase a usage rate of a 0-digit verification manner in the resource transfer performed through face recognition, and improve the accuracy of face scan resource transfer, so as to solve the problem of recognition of some highly similar faces, and effectively improve a convenience of resource transfer by resource transfer objects, thereby feeding back the face scan resource transfer to form an effective closed loop and improve a user experience.

Detailed descriptions are separately provided below. A description order of the following embodiments is not construed as a limitation on a preferred order of the embodiments.

This embodiment will be described from the perspective of a face recognition apparatus. The face recognition apparatus can be specifically integrated in an electronic device. The electronic device may be a server, a terminal or other devices. The terminal may include a mobile phone, a tablet, a notebook computer, and a Personal Computer (PC).

A face recognition method includes: obtaining resource transfer information initiated at a resource transfer place, the resource transfer information including a face image feature of a resource transfer object and a device identification of a resource transfer device; then searching for a target face feature matching the face image feature from a face database, and determining a target object corresponding to the target face feature; searching, from a graph feature database, for a resource transfer device graph feature corresponding to the device identification and a target object graph feature corresponding to the target object; calculating, according to the resource transfer device graph feature and the target object graph feature, an initial resource transfer probability that the target object performs resource transfer at the resource transfer place; generating a fused resource transfer probability according to a similarity between the face image feature and the target face feature and the initial resource transfer probability; and recognizing a resource transfer verification manner of the resource transfer object according to the fused resource transfer probability.

Figure 1B:
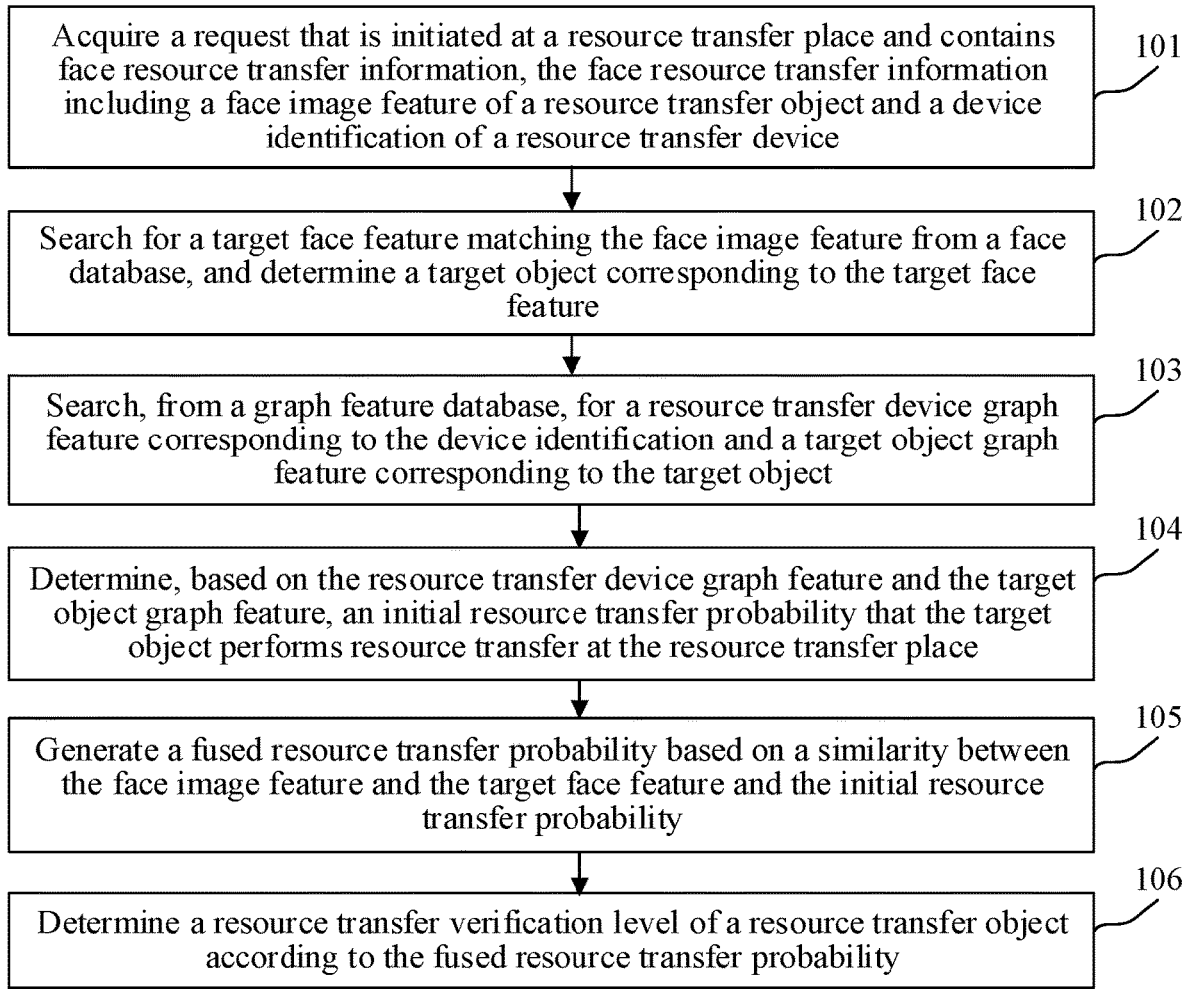
FIG. 1b is a first flowchart of a face recognition method provided by an embodiment of this application.

As shown in FIG. 1b, a specific flow of the face recognition method can be as follows:

101. Obtain a request that is initiated at a resource transfer place and contains resource transfer information, the resource transfer information including a face image feature of a resource transfer object and a device identification of a resource transfer device.

The resource transfer place may refer to a place where a resource transfer object needs to perform a resource transfer transaction, such as a supermarket, a store, a shop, and a convenience store. The resource transfer object may refer to an object that needs to be recognized in a resource transfer verification manner during face scan resource transfer, for example, a user purchasing a commodity.

For example, specifically, when a resource transfer request initiated at the resource transfer place is received, a face image of the resource transfer object and the device identification of the resource transfer device that initiates the resource transfer request are obtained according to the resource transfer request; and feature extraction is performed on the face image of the resource transfer object to obtain the face image feature.

For example, specifically, when the resource transfer object (such as user XX) purchases a commodity at the resource transfer place (such as store YY), and uses the resource transfer device (such as device ZZ) to perform resource transfer, the resource transfer request is generated and sent to a face recognition apparatus, so that the face recognition apparatus performs face detection and registration on user XX and obtains a device identification sn of device ZZ by, for example, capturing the face of user XX to obtain a face image of user XX and performing feature extraction on the face image of user XX to obtain a face image feature of user XX.

A multi-task convolutional neural network (MTCNN) method can be used for face detection. The MTCNN is a deep learning-based face detection and face alignment method, which can simultaneously complete tasks of face detection and face alignment. By using a cascaded CNN structure and performing multi-task learning, two tasks, the face detection and the face alignment, are completed simultaneously to output a Bounding Box of the face and positions of key points (the eyes, the nose and the mouth) of the face. The face detection and alignment according to the MTCNN is a model of face detection and five-point calibration in a network, achieving a multi-task learning network mainly by cascading of a CNN model. The entire model can be divided into three stages. In the first stage, a shallow CNN network is used to quickly generate a series of candidate windows. In the second stage, a CNN network with higher performance is used to filter out most of non-face candidate windows. In the third stage, a network with the highest performance is used to find five marked points on the face.

Image registration may use affine transformation. If only translation, rotation, and scaling are considered, transformation between a floating image and a fixed image contains six parameters, and only three point pairs, namely, six equations, may be required to solve this problem. The purpose is to standardize the face in any posture collected by a camera. The face scan is mainly cooperative face recognition. In comparison, a collected face posture is not very large, so the simple MTCNN can process it. The face detection technology is not described in detail here.

The face image may be a red, green, blue (RGB) image; features of the RGB image can be extracted using a deep learning model. The deep learning model can be obtained by offline training using a mass of RGB pictures with identity labels. A training algorithm may be a margin based softmax method, for example, inputting a standardized image into the deep learning model, so as to obtain feature F with a corresponding dimension. Due to the large training scale of industrial face recognition, each ID corresponds to one class, so a last classification layer consumes lots of resources. Therefore, the classification layer adopts a model-parallel manner. The classification layer is subjected to mixed training by a data-parallel manner.

102. Search for a target face feature matching the face image feature from a face database, and determine a target object corresponding to the target face feature.

For example, it may specifically include: calculating similarities between the face image feature and candidate face features in the face database; and obtaining the target face feature with the similarity satisfying a preset condition from the face database according to a calculation result, and determining the target object corresponding to the target face feature.

The face database can be configured before recognition of a resource transfer verification manner, and stored in the face recognition apparatus. For example, face features of historical resource transfer objects may be stored as the candidate face features in the face database according to historical resource transfer information of all resource transfer devices.

In order to increase the usage rate of the 0-digit verification manner during the resource transfer, improve the accuracy of resource transfer by using the face scan, and fully mine the information about structure between the resource transfer object and the resource transfer device, a plurality of target face features with the similarities satisfying the preset condition can be selected from the candidate face features. For example, in order to improve the recognition accuracy of the face scan resource transfer and ensure the efficiency of the face scan resource transfer, the target face features can be two face features with the similarities satisfying the preset condition.

The preset condition can be set in many ways. For example, the preset condition can be flexibly set according to requirements of practical applications, or can be preset and stored in the electronic device. In addition, the preset condition may be configured in the electronic device, or may be stored in a memory and sent to the electronic device. For example, the preset condition may be two face features with the highest similarities (top2), that the similarity meets a certain threshold, or the like.

For example, the target face feature includes a first face feature and a second face feature. The target object includes a first object and a second object, which may specifically include: calculating the similarities between the face image feature and the candidate face features in the face database; ranking the similarities between the face image features and the candidate face features according to the calculation result; obtaining the first face feature corresponding to a first similarity and the second face feature corresponding to a second similarity from the candidate face features according to a ranking result of the similarities; determining the first face feature and the second face feature as the target face feature, and determining the first object corresponding to the first face feature and the second object corresponding to the second face feature. For example, the first face feature corresponding to the first similarity ranked at the first place (namely, top 1) and the second face feature corresponding to the second similarity ranked at the second place can be obtained according to the ranking result. That is, the first similarity can refer to a similarity ranked at the first place, and the second similarity can refer to a similarity ranked at the second place.

For example, extracted face feature P can be input according to an open source faiss library; most two similar face features (top2) can be retrieved; and corresponding similarity scores and user IDs can be obtained. For example, top2 refers to user A and user B respectively. The face feature of user A is Pa, and the face feature of user B is Pb. A similarity score can be measured by cosine. For example, the specific calculation can be as follows:

$$Sim\_a = cosine(P, pa)$$

$$Sim\_b = cosine(P, pb)$$

103. Search, from a graph feature database, for a resource transfer device graph feature corresponding to the device identification and a target object graph feature corresponding to the target object.

For example, when the target face feature includes the first face feature and the second face feature, and the target object includes the first object and the second object, it may specifically include: searching, from the graph feature database, for the resource transfer device graph feature corresponding to the device identification, a first object graph feature corresponding to the first object, and a second object graph feature corresponding to the second object.

In order to improve the efficiency of recognizing a resource transfer verification manner, the graph feature database can be established first, and then the resource transfer device graph feature corresponding to the device identification and the target object graph feature corresponding to the target object can be searched from the graph feature database. In some embodiments, graph features in the graph feature database may be trained from a plurality of training samples. Specifically, the graph features can be provided for the face recognition apparatus after being trained by other devices, or the face recognition apparatus can also train graph features on its own. That is, before the searching, from the graph feature database, for the resource transfer device graph feature corresponding to the device identification and the target object graph feature corresponding to the target object, the face recognition method may further include:

collecting a plurality of training sample pairs, the training sample pairs including at least one positive sample and at least one negative sample;

respectively performing feature initialization on sample objects and sample devices in the training sample pairs to obtain initial object features and initial device features;

training the initial object features and the initial device features according to the positive samples and the negative samples to obtain object graph features and device graph features; and storing the object graph features and the device graph features to the graph feature database.

There are many ways to collect the training sample pairs. For example, a method for representing learning by a heterogeneous network can be used to simultaneously capture structural and semantic relations between different types of nodes, such as the sample objects and the sample devices. For example, the step of "collecting a plurality of training sample pairs, the training sample pairs including at least one positive sample and at least one negative sample" may specifically include: determining link relations between the sample objects and the sample devices according to a historical resource transfer record, and constructing a heterogeneous network graph of the sample objects and the sample devices according to the link relations; and performing, in the heterogeneous network graph, path sampling on the sample objects and sample devices serving as nodes, all paths having the link relations between the collected nodes being used as the positive samples, and at least one path having no link relation between the collected nodes being used as the negative samples. For example, the graph model can be obtained by offline training. Firstly, the sample objects and the sample devices in a historical face scan record can be taken as two types of node. An edge relation is added for a sample device by which a sample object performs resource transfer, so as to form a bigraph of the sample object and the sample device. This is a heterogeneous graph as the nodes belong to different types. The heterogeneous network graph has different node types or different connection relations. For example, an academic heterogeneous network graph may have four types of nodes: organization (O), author (A), paper (P) and conference (V). The academic heterogeneous network graph may include various types of node relations, such as co-author relation (AA), author publication relation (AP), and cooperation relations (OA).

There may also be many ways to sample the sample objects and the sample devices in the heterogeneous network graph. For example, the training sample pairs of the sample objects and the sample devices can be obtained by random walk in a certain order. The step of "performing, in the heterogeneous network graph, path sampling on the sample objects and sample devices serving as nodes" may specifically include: obtaining a pre-defined meta-path by taking the sample objects and the sample devices as different types of nodes, the meta-path including the link relations between the different types of nodes; calculating a transfer probability of each step according to the link relations between the different types of nodes in the meta-path, and determining a random walk sampling policy according to the transfer probability of each step; and performing, in the heterogeneous network graph, path sampling according to the random walk sampling policy.

The meta-path is a specific path connecting two entities, such as "actor→movie→director→movie→actor". This meta-path can connect two actors, so it can be considered as a way to mine a potential relation between the actors. The advantage of this way is that a network structure of a knowledge map is fully and intuitively exploited. The meta-path can be searched for the similarities in a heterogeneous network. Meta-path is a path that contains a sequence of relations, and these relations are defined between different types of objects.

For example, the sequence (namely, the path) may be specifically collected using a meta-path-based random walk scheme. This random walk way can capture the semantic relations and the structural relations between different types of vertices at the same time, which promotes transformation of a heterogeneous network structure to a Skip-Gram model of metapath2vec. A meta-path scheme may be defined as follows:

$$p: V_1 \xrightarrow{R_1} V_2 \xrightarrow{R_2} \ldots V_t \xrightarrow{R_t} V_{t+1} \ldots \xrightarrow{R_{l-1}} V_l$$

where E represents an edge; V represents a node; R represents a random walk; N represents a neighbor node; and $R_i$ represents a relation between different types of nodes $V_i$ and $V_{i+1}$. A transfer probability of an ith step is defined as:

$$p(v^{i+1} | v_t^i, p) = \begin{cases} \frac{1}{|N_{t+1}(v_t^i)|} & (v^{i+1}, v_t^i) \in E, \phi(v^{i+1}) = t+1 \\ 0 & (v^{i+1}, v_t^i) \in E, \phi(v^{i+1}) \neq t+1 \\ 0 & (v^{i+1}, v_t^i) \notin E \end{cases}$$

where $v_t^i \in V_t$, $N_{t+1}(v_t^i)$ represents a domain vertex set of type $V_{t+1}$ of vertex $v_t^i$. Then, the above three equations represent:

1. There is an edge between two points, and a next point belongs to a next type of node on a well-defined metapath.
2. There is an edge between two points, but a next point does not belong to a next type of node on a well-defined metapath.
3. There is no edge between two points.

A recursive guidance for random walker is then used, which, for example, may be as follows:

$$p(v^{i+1} | v_t^i) = p(v^{i+1} | v_1^i), \text{ if } t = 1$$

After a large number of training sample pairs are obtained by sampling according to the above formulas, the training sample pairs can be used for training. There are many ways of training. For example, the features of the sample objects and the sample devices can be initialized randomly. A reasonable loss function and a gradient back-propagation algorithm are then used for training, so as to obtain final effective features of the sample objects and the sample devices.

For example, the step of "training the initial object features and the initial device features according to the positive samples and the negative samples to obtain object graph features and device graph features" may specifically include: calculating extents of correlation between the initial object features and the initial device features in the positive samples to obtain a predicted result of the positive samples; calculating extents of correlation between the initial object features and the initial device features in the negative samples to obtain a predicted result of the negative samples; and using a loss function to adjust the initial object features and the initial device features according to the predicted result of the positive samples, an actual result of the positive samples, the predicted result of the negative samples and an actual result of the negative samples, and obtaining the object graph features and the device graph features until the loss function converges.

There are many kinds of loss functions for selection. For example, softmax, Triplet loss, or other loss functions can be used.

For example, a skip-gram model is used to train the loss function softmax, and a specific formula may be as follows:

$$p(c_t|v;\theta) = \frac{e^{X_{c_t}} * e^{X_v}}{\sum_{u \in V} e^{X_u} * e^{X_v}}$$

This formula is actually down-sampled softmax. The training sample pairs obtained by the metapath may be that one pair of positive samples correspond to N pairs of negative samples, and are then trained with softmax+crossentropy-loss.

For another example, in order to further improve the accuracy of recognizing a resource transfer verification manner and determine more accurately whether they are the same face, the skip-gram can be used to training Triplet loss. Triplet Loss is a loss function in deep learning, which is used to train samples with small differences, such as faces. Input data includes an anchor example, a positive example and a negative example. By optimizing a distance between the anchor example and the positive example to be less than a distance between the anchor example and the negative example, the similarities of the samples are calculated. Triplet loss learns good feature embedding, and similar images are close in an embedding space, which can determine whether the similar images are the same face, which can be specifically as follows:

A triplet <a, p, n> is input, where a represents anchor; p represents positive, which is a sample of the same type as a; and n represents negative, which is a sample of a different type from a. A formula may be as follows:

$$L=\max(d(a,p)-d(a,n)+\text{margin},0)$$

Therefore, a final optimization goal is to make a, p closer and make a, n farther.

For easy triplets: L=0, namely, d(a, p)+margin<d(a, n). In this case, optimization is not required. Naturally, a, p are close to each other, and a, n are far from each other.

For hard triplets: d(a, n)<d(a, p), namely, a, p are far from each other.

For semi-hard triplets: d(a, p)<d(a, n)<d(a, p)+margin, namely, a, n are close to each other, but there is margin.

104. Determine, according to the resource transfer device graph feature and the target object graph feature, an initial resource transfer probability that the target object performs resource transfer at the resource transfer place.

For example, it may specifically include: calculating the extents of correlation between the resource transfer device graph feature and the target object graph feature may be calculated; and determining, according to the extents of correlation, the initial resource transfer probability that the target object performs resource transfer at the resource transfer place. For example, a cosine similarity function may be used to compute the extents of correlation between the resource transfer device graph feature and the target object graph feature.

For example, when the initial resource transfer probability includes a first resource transfer probability and a second resource transfer probability, it may specifically include: calculating, according to the resource transfer device graph feature and the first object graph feature, the first resource transfer probability that the first object performs the resource transfer at the resource transfer place, and calculating, according to the resource transfer device graph feature and the second object graph feature, the second resource transfer probability that the second object performs the resource transfer at the resource transfer place. For example, it may specifically include: calculating a first extents of correlation between the resource transfer device graph feature and the first object graph feature; determining, according to the first extents of correlation, the first resource transfer probability that the first object performs the resource transfer at the resource transfer place; calculating a second extents of correlation between the resource transfer device graph feature and the second object graph feature may be calculated; and determining, according to the second extents of correlation, the second resource transfer probability that the second object performs the resource transfer at the resource transfer place. For example, it can be specifically as follows:

$P\_a\_sn=\text{cosine}(Fa,sn)$   First resource transfer probability:

$P\_b\_sn=\text{cosine}(Fb,sn)$   Second resource transfer probability:

105. Generate a fused resource transfer probability according to a similarity between the face image feature and the target face feature and the initial resource transfer probability.

There are many ways to generate the fused resource transfer probability. For example, the similarity and the initial resource transfer probability may be fused in a linear interpolation fusion manner. For example, it may specifically include: obtaining a first interpolation coefficient of the similarity between the face image feature and the target face feature and a second interpolation coefficient of the initial resource transfer probability; and fusing the similarity between the face image feature and the target face feature with the initial resource transfer probability according to the first interpolation coefficient and the second interpolation coefficient to obtain the fused resource transfer probability. In order to improve the accuracy of fusion, a sum of the first interpolation coefficient and the second interpolation coefficient may be 1.

When the initial resource transfer probability includes the first resource transfer probability and the second resource transfer probability, it may specifically include: generating a first fusion probability according to the first similarity and the first resource transfer probability, and generating a second fusion probability according to the second similarity and the second resource transfer probability. For example, the first fusion probability Pa (Sim_a, P_a_sn) may be calculated according to a fusion of Sim_a and P_a_sn, and the second fusion probability Pb (Sim_b, P_b_sn) may be calculated according to a fusion of Sim_b and P_b_sn. For example, it can be specifically a linear interpolation fusion as follows:

$$Pa(Sim\_a, P\_a\_sn) = (1-w)*Sim\_a + w*P\_a\_sn$$

$$Pb(Sim\_b, P\_b\_sn) = (1-w)*Sim\_b + w*P\_b\_sn$$

The calculated fused resource transfer probability may refer to a probability that the resource transfer object uses the resource transfer device to transfer resources at the resource transfer place. If there is a resource transfer device at the resource transfer place, the fused resource transfer probability may refer to a probability that the resource transfer object performs resource transfer at the resource transfer place. If there are a plurality of resource transfer devices at the resource transfer place, a probability that the resource transfer object performs resource transfer at the resource transfer place may be determined with reference to the fused resource transfer probabilities (for example, a mean of the fused resource transfer probabilities of the plurality of resource transfer devices may be calculated) of the plurality of resource transfer devices. The specific process is not described in detail herein.

106. Determine a resource transfer verification manner of the resource transfer object according to the fused resource transfer probability.

In some embodiments, the resource transfer verification manner refers to a level at which a user needs to perform verification during the resource transfer, and in particular may refer to how many bits of a check code a user needs to input during the resource transfer, for example, a check code a user needs to input during payment at a place of payment.

For example, when the fused resource transfer probability includes the first fusion probability and the second fusion probability, it may specifically include: obtaining a maximum probability value of the first fusion probability and the second fusion probability, and determining the maximum probability value as a first measurement value; obtaining a minimum probability value of the first fusion probability and the second fusion probability; calculating a difference value between the maximum probability value and the minimum probability value, and determining the difference value as a second measurement value; determining, when the first measurement value is greater than a first preset threshold and the second measurement value is greater than a second preset threshold, that a resource transfer verification manner of the resource transfer object is a first verification manner; determining, when the first measurement value is greater than a first preset threshold or the second measurement value is greater than a second preset threshold, that a resource transfer verification manner of the resource transfer object is a second verification manner; and determining, when the first measurement value is less than or equal to a first preset threshold and the second measurement value is less than or equal to a second preset threshold, that a resource transfer verification manner of the resource transfer object is a third verification manner.

For example, three kinds of mobile phone number-based verification modes are determined: a 0-digit manner, a 4-bit manner, and an 11-bit manner according to formulas max (Pa, Pb)>threshold1 (the first threshold) and max (Pa, Pb)−min (Pa, Pb)>threshold2 (the second threshold). If both of the two formulas are satisfied, the verification manner is the 0-digit manner, that is, no mobile phone number needs to be typed in. If only one formula is satisfied, four digits of a mobile phone number needs to be typed in for verification. If neither of the above-mentioned preset two formulas are satisfied, a 11-bit mobile phone number needs to be typed in for verification.

The 0-digit manner can directly recognize a face from a hundred million-level face database without any verification of a user. The 4-digit manner can recognize several faces from the hundred million-level face database, and a user needs to type in the last four digits of a bound mobile phone number for confirmation. The 11-digit manner can be used when a user cannot be recognized, and the user is required to type in a bound 11-digit mobile phone number and be recognized.

The first preset threshold and the second preset threshold can be set in many ways. For example, they can be flexibly set according to requirements of practical applications, or can be preset and stored in the electronic device. In addition, the first preset threshold and the second preset threshold may be configured in the electronic device, or may be stored in a memory and sent to the electronic device.

In order to improve the security of recognition of a resource transfer verification manner, data in the above-mentioned method is all stored in a blockchain. The blockchain is a new application mode of computer technologies such as distributed data storage, point-to-point transmission, a consensus mechanism, and an encryption algorithm. The blockchain is basically a decentralized database and is a string of data blocks generated through association by using a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

The blockchain underlying platform may include processing modules such as a user management module, a basic service module, a smart contract module, and an operation supervision module. The user management module is responsible for identity information management of all blockchain participants, including maintaining public-private key generation (account management), key management, maintaining a correspondence between the real identity of a user and a blockchain address (permission management), and the like, supervising and auditing transaction conditions of some real identities with authorization, and providing rule configuration of risk control (risk control auditing). The basic service module is deployed on all blockchain node devices and configured to verify the validity of a service request, and after a consensus is reached on a valid request, record the valid request in storage.

For a new service request, the basic service module first parses interface adaptation and performs authentication processing (interface adaptation), then encrypts service information by using a consensus algorithm (consensus management), transmits the complete and consistent service information after encryption to a shared ledger (network communication), and performs recording and storing. The smart contract module is responsible for contract registration and publication, contract triggering, and contract execution. A developer may define contract logic by using a programming language, and release the contract logic onto a blockchain (contract registration). According to the logic of contract items, a key or another event is invoked to trigger execution, to complete the contract logic. The function of upgrading or canceling a contract is further provided. The operation supervision module is mainly responsible for deployment, configuration modification, contract setting, and cloud adaptation during product releasing and visualized output of a real-time status during product operation, for example, alarming, monitoring network conditions, and monitoring a health status of a node device.

The platform product service layer provides basic capabilities and an implementation framework of a typical application. According to these basic capabilities, developers may superpose characteristics of services and complete blockchain implementation of service logic. The application service layer provides a blockchain solution-based application service for use by a service participant.

It is known from the above that this embodiment can obtain resource transfer information initiated at a resource transfer place, the resource transfer information including a face image feature of a resource transfer object and a device identification of a resource transfer device; then search for a target face feature matching the face image feature from a face database, and determine a target object corresponding to the target face feature; search, from a graph feature database, for a resource transfer device graph feature corresponding to the device identification and a target object graph feature corresponding to the target object; calculate, according to the resource transfer device graph feature and the target object graph feature, an initial resource transfer probability that the target object performs resource transfer at the resource transfer place; generate a fused resource transfer probability according to a similarity between the face image feature and the target face feature and the initial resource transfer probability; and recognize a resource transfer verification manner of the resource transfer object according to the fused resource transfer probability.

By making full use of the information about resource transfer between an object and a device in a historical resource transfer record, that is, the face image feature of the resource transfer object and the device identification of the resource transfer device in the historical resource transfer record, constructing a heterogeneous network graph of the object and the device, and fully mining structure information of the object and the device in the heterogeneous network graph (for example, an unsupervised training framework of metapath2vec and skip2 gram), this scheme can complete a similar effect of collaborative filtering. For example, many objects of device A also scan the faces on device B, and there is a certain probability that remaining persons of device A that do not scan the face on device B will scan the face on device B. Finally, a graph model constructs a probability that the object uses the device to perform the resource transfer or a transfer probability between the object and the device through measurements of the object features and the device features. A comprehensive decision is made by combining the face recognition technology in the face recognition apparatus, thereby greatly improving the accuracy of face recognition of face scan resource transfer and solving the problem of recognition of some highly similar faces, so that the usage rate of the 0-digit verification manner is greatly increased in the face scan resource transfer. A convenience of resource transfer by resource transfer objects is effectively improved, thereby feeding back the face scan resource transfer to form an effective closed loop and improve a user experience. Users feel "safer while scanning the face."

According to the method described in the previous embodiment, the following further provides detailed description by using an example.

In this embodiment, the face recognition apparatus is specifically integrated in the electronic device. The resource transfer object is specifically a resource transfer user. The resource transfer device is specifically a face resource transfer device. The face image feature is specifically a human face image feature. The target face feature specifically includes a first face feature and a second face feature. The target object specifically includes a first user and a second user. The resource transfer place is specifically a target store (namely, a store where the face resource transfer device that currently initiates the resource transfer request is located).

(I) First, a face database may be established, which can be specifically as follows:

A face image of a historical resource transfer user is obtained according to historical resource transfer information of all resource transfer devices. Feature extraction is performed on the face image of the historical resource transfer user to obtain face features of the historical resource transfer user. The face features of the historical resource transfer user are stored in the face database as candidate face features.

(II) Next, a graph feature database may be established, which may be specifically as follows:

In order to improve the efficiency of recognition of a resource transfer verification manner, the graph feature database can be established first. Graph features in the graph feature database may be trained from a plurality of training samples. Specifically, the graph features may be provided for the face recognition apparatus after being trained by other devices, or the face recognition apparatus may perform training on its own. For example, the electronic device may specifically collect a plurality of training sample pairs, the training sample pairs including at least one positive sample and at least one negative sample; respectively perform feature initialization on sample users and sample devices to obtain initial user features and initial device features; train the initial user features and initial device features according to the positive samples and the negative samples to obtain user graph features and device graph features; and store the user graph features and device graph features to the graph feature database.

Figure 2A:
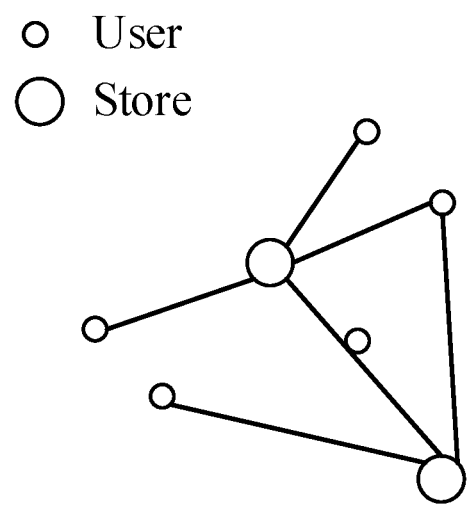
FIG. 2a is a first schematic diagram of a heterogeneous network graph provided by an embodiment of this application.

For example, the electronic device may specifically determine link relations between the sample users and the sample devices according to a historical resource transfer record, and construct a heterogeneous network graph of the sample users and the sample devices according to the link relations; and perform, in the heterogeneous network graph, path sampling on the sample objects and sample devices serving as nodes, all paths having the link relations between the collected nodes being used as the positive samples, and at least one path having no link relation between the collected nodes being used as the negative samples. For example, the graph model can be obtained by offline training. Firstly, the sample users and the sample devices of sample stores in a historical face scan record can be taken as two types of nodes. An edge relation is added for a sample device by which a sample user performs resource transfer at a sample store, so as to form a bigraph of the sample user and the sample store. This is a heterogeneous graph as the nodes belong to different types, for example, as shown in FIG. 2a. After a relation is established between the user and the store, the initial features of the user and the store are then obtained. Store's and user's own attributes are not helpful to predict whether a user arrives at a store, because they are basically collaboratively filtered. In addition, many feature engineering works are involved. Therefore, random feature initialization can be performed on the sample users and the sample devices of the sample store, and then a reasonable loss function and a gradient back-propagation algorithm are used for training to obtain final valid features of the user and the store.

The collaborative filtering refers to recommending information a user is interested in by using preferences of a group with a similar hobby and common experience. Individuals provide considerable responses (such as scores) for the information through a cooperation mechanism and record the responses, so as to achieve the purpose of filtering and help others to screen information. The responses are not necessarily limited to records of information of particular interest, and records of information of no particular interest may also be considered. In this scheme, an arrival probability of a group with common features can be used to determine an arrival probability of the resource transfer user, thereby determining a resource transfer verification manner of the resource transfer user.

For example, in the heterogeneous network graph, a manner of metapath2vec can be used to perform random walk in a certain order to obtain the training sample pair of the sample user and the sample device. In order to prevent the problem of the node feature homogenization, only second-order neighbors can be taken, because higher orders will cause the problem of the node feature homogenization. For example, the electronic device may specifically obtain a pre-defined meta-path by taking the sample users and the sample devices as different types of nodes, the meta-path including the link relations between the different types of nodes; calculate a transfer probability of each step according to the link relations between the different types of nodes in the meta-path, and determine a random walk sampling policy according to the transfer probability of each step; and perform, in the heterogeneous network graph, path sampling according to the random walk sampling policy.

For example, the sequence (namely, the path) may be specifically collected using a meta-path-based random walk scheme. This random walk way can capture the semantic relations and the structural relations between different types of vertices at the same time, which promotes transformation of a heterogeneous network structure to a Skip-Gram model of metapath2vec. A meta-path scheme may be defined as follows:

$$p: V_1 \xrightarrow{R_1} V_2 \xrightarrow{R_2} \ldots V_t \xrightarrow{R_t} V_{t+1} \ldots \xrightarrow{R_{l-1}} V_l$$

where E represents an edge; V represents a node; R represents a random walk; N represents a neighbor node; and $R_i$ represents a relation between different types of nodes $V_i$ and $V_{i+1}$. A transfer probability of an ith step is defined as:

$$p(v_t^{i+1} | v_t^i, p) = \begin{cases} \frac{1}{|N_{t+1}(v_t^i)|} & (v^{i+1}, v_t^i) \in E, \phi(v^{i+1}) = t+1 \\ 0 & (v^{i+1}, v_t^i) \in E, \phi(v^{i+1}) \neq t+1 \\ 0 & (v^{i+1}, v_t^i) \notin E \end{cases}$$

where $v_t^i \in V_t$, $N_{t+1}(v_t^i)$ represents a domain vertex set of type $V_{t+1}$ of vertex $v_t^i$. Then, the above three equations represent:
1. There is an edge between two points, and a next point belongs to a next type of node on a well-defined metapath.
2. There is an edge between two points, but a next point does not belong to a next type of node on a well-defined metapath.
3. There is no edge between two points.

A recursive guidance for random walker is then used, which, for example, may be as follows:

$$p(v^{i+1}|v_t^i) = p(v^{i+1}|v_1^i), \text{ if } t = 1$$

After a large number of training sample pairs are obtained by sampling according to the above formulas, the training sample pairs can be used for training. For example, the electronic device may specifically calculate extents of correlation between the initial user features and the initial device features in the positive samples to obtain a predicted result of the positive samples; calculate extents of correlation between the initial user features and the initial device features in the negative samples to obtain a predicted result of the negative samples; and use a loss function to adjust the initial user features and the initial device features according to the predicted result of the positive samples, an actual result of the positive samples, the predicted result of the negative samples and an actual result of the negative samples, and obtain the user graph features and the device graph features until the loss function converges.

For example, the training can be specifically performed in a skip-gram manner, so as to obtain the final user's and store's features, namely, the user graph features and the device graph features. For example, the skip-gram is used to train the loss function, and a specific formula may be as follows:

$$p(c_t|v;\theta) = \frac{e^{X_{c_t}} * e^{X_v}}{\sum_{u \in V} e^{X_u} * e^{X_v}}$$

This formula is actually down-sampled softmax. The training sample pairs obtained by the metapath may be that one pair of positive samples correspond to N pairs of negative samples, and are then trained with softmax+crossentropy-loss. For example, in order to improve the efficiency and accuracy of recognition of a resource transfer verification manner, one positive sample may correspond to 16 negative samples.

Figure 2B:
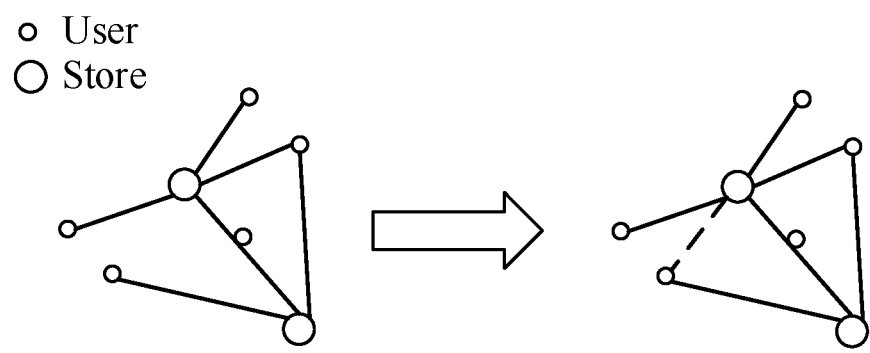
FIG. 2b is a second schematic diagram of a heterogeneous network graph provided by an embodiment of this application.

One characteristic of using the graph method is that a dotted line relation on the right of FIG. 2b can be mined. That is, a user does not go to a certain store, but a possibility that the user will go to the store to scan the face in the future can be captured according to a topological relation between a user and a store. This ability cannot be achieved by general regular methods.

Figure 2C:
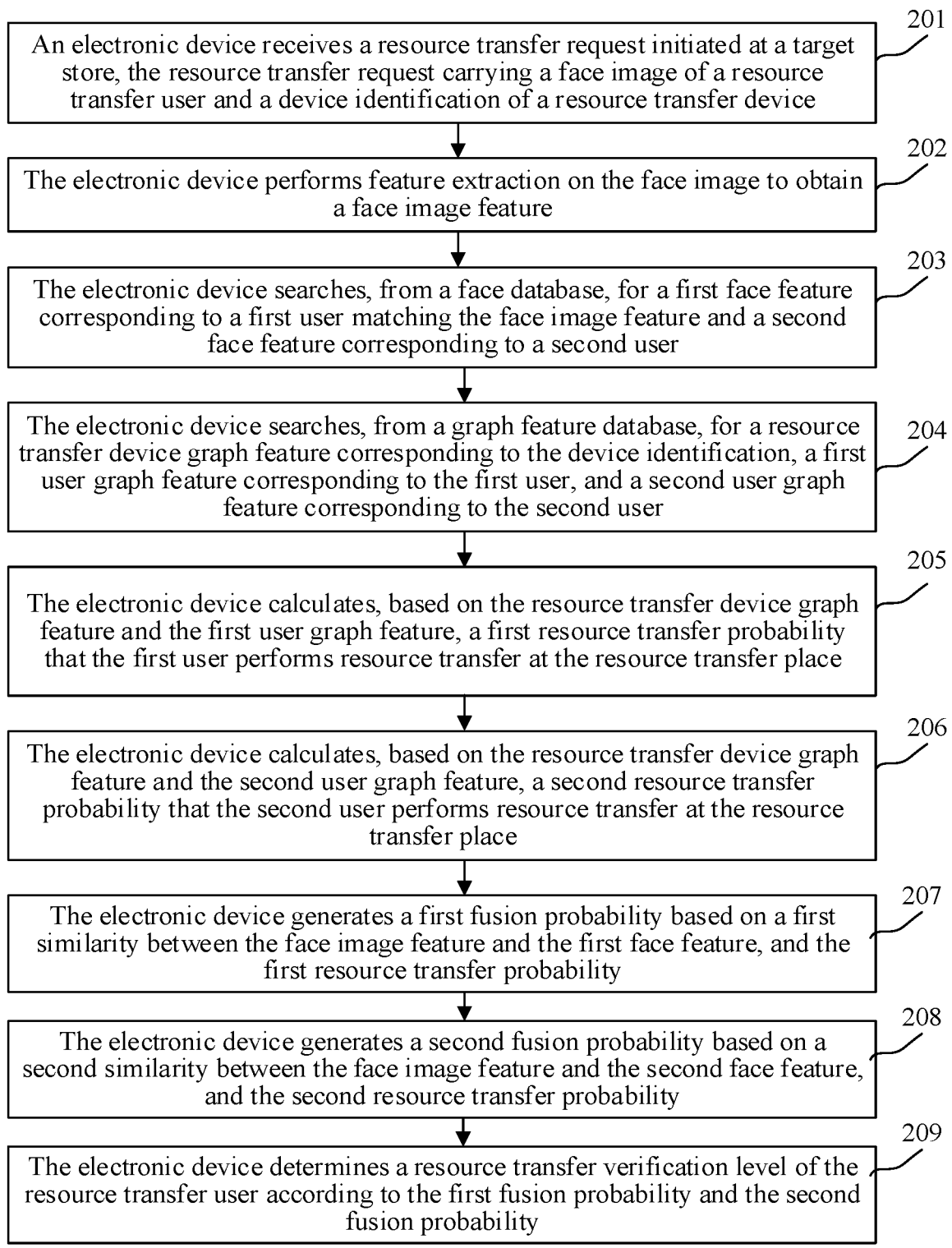
FIG. 2c is a second flowchart of a face recognition method provided by an embodiment of this application.
Figure 2D:
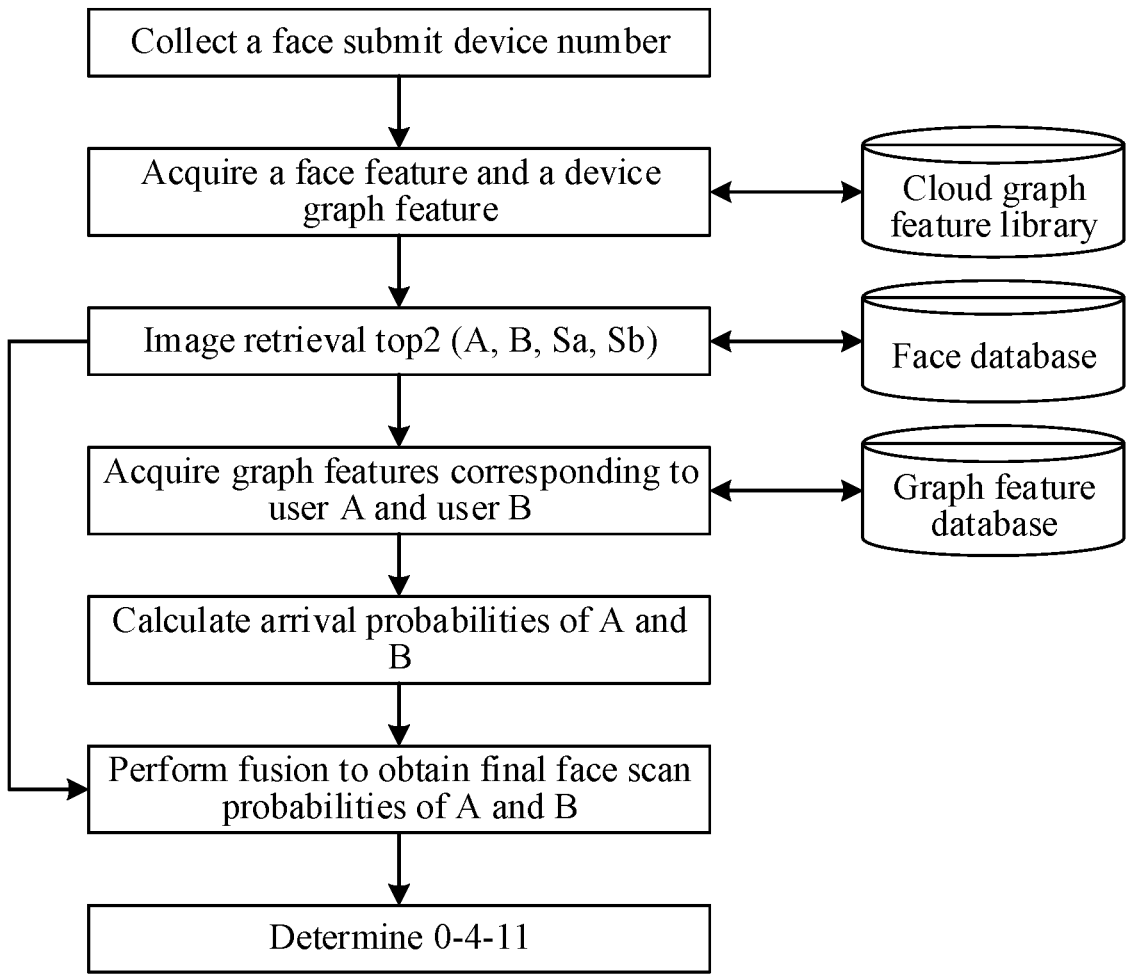
FIG. 2d is a third flowchart of a face recognition method provided by an embodiment of this application.
Figure 2E:
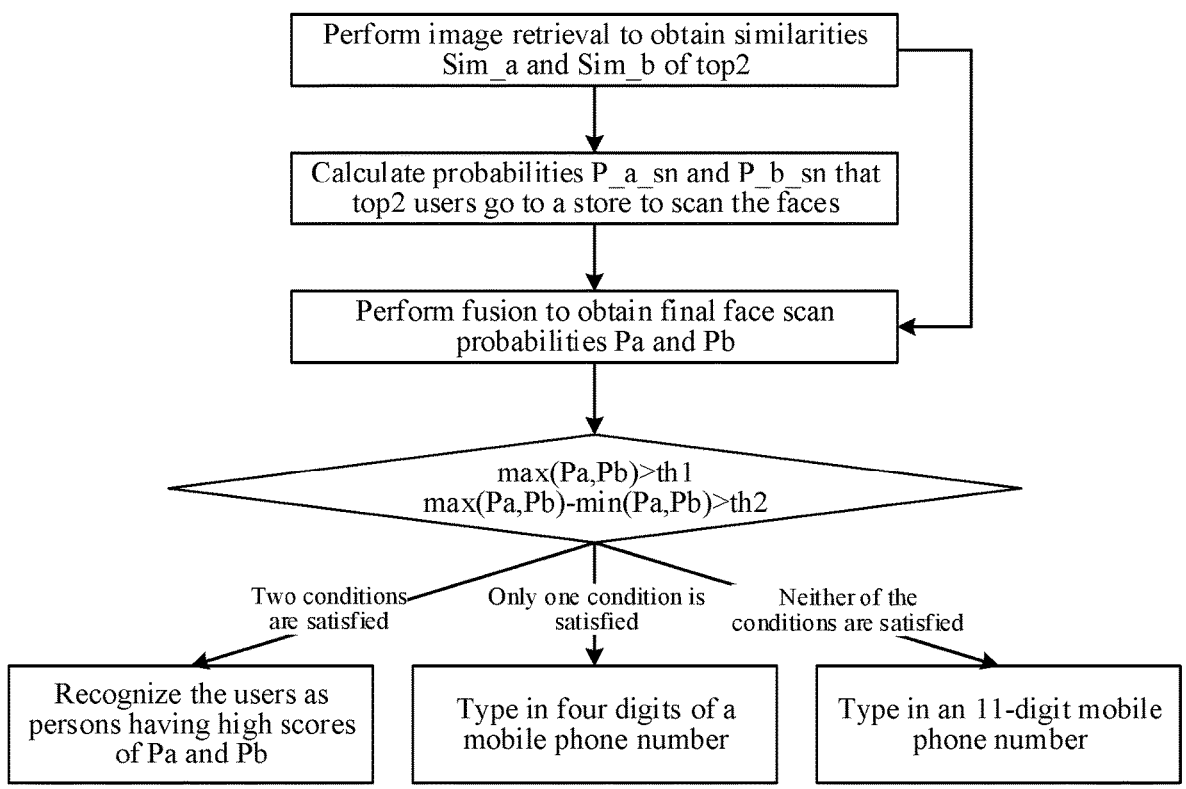
FIG. 2e is a fourth flowchart of a face recognition method provided by an embodiment of this application.

(III) The established face database and graph feature database are used to determine a resource transfer verification manner by which the resource transfer user performs the resource transfer. Reference can be made to FIG. 2c, FIG. 2d, and FIG. 2e for details.

As shown in FIG. 2c, a face recognition method may include a specific flow as follows:

201. The electronic device receives a resource transfer request initiated at a target store, the resource transfer request carrying a face image of a resource transfer user and a device identification of a face resource transfer device.

The target store may refer to a store where the resource transfer user needs to perform resource transfer to purchase a commodity. The resource transfer user may refer to a user that needs to be determined in a resource transfer verification manner during face scan resource transfer, for example, a user purchasing a commodity.

For example, when the resource transfer request initiated by the target store is received, the face image of the resource transfer user and the device identification of the face resource transfer device initiating the resource transfer request can be specifically obtained.

For example, the electronic device may specifically perform face detection on user X when the resource transfer user (for example, user X) purchases a commodity at the target store (for example, store Y) and uses the face resource transfer device (for example, device S) to perform resource transfer, so as to obtain a face image of user X and a device identification sn of device S to perform face detection and registration on user X.

For example, the face detection may use mtcnn, and the registration may use affine transformation. The purpose is to standardize the face in any posture collected by a camera. The face scan is mainly cooperative face recognition. In comparison, a collected face posture is not very large, so the mtcnn detection manner can be used.

202. The electronic device performs feature extraction on the face image to obtain a face image feature.

The face image obtained by the electronic device may be an RGB image; features of the RGB image can be extracted using a deep learning model. The deep learning model can be obtained by offline training using a mass of RGB pictures with identity labels. A training algorithm may be a margin based softmax method, for example, inputting a standardized image into the deep learning model, so as to obtain feature F with a corresponding dimension. Due to the large training scale of industrial face recognition, each ID corresponds to one class, so a last classification layer consumes lots of resources. Therefore, the classification layer adopts a model-parallel manner. The classification layer is subjected to mixed training by a data-parallel manner.

203. The electronic device searches, from a face database, for a first face feature corresponding to a first user matching the face image feature and a second face feature corresponding to a second user.

For example, the electronic device may specifically calculate similarities between the face image feature and candidate face features in the face database; ranking the similarities between the face image features and the candidate face features according to a calculation result; obtain, from the ranking according to a ranking result, a first face feature corresponding to a first similarity and a second face feature corresponding to a second similarity; and determine the first face feature and second face feature as target face features, and determine the first user corresponding to the first face feature and the second user corresponding to the second face feature. For example, the first face feature corresponding to the first similarity ranked at the first place (namely, top one) and the second face feature corresponding to the second similarity ranked at the second place can be obtained according to the ranking result. That is, the first similarity can refer to a similarity ranked at the first place, and the second similarity can refer to a similarity ranked at the second place.

For example, extracted face feature P can be input according to an open source faiss library; top2 most similar face features can be retrieved; and corresponding similarity scores and user IDs can be obtained. For example, top2 refers to user A and user B respectively. The face feature of user A is Pa, and the face feature of user B is Pb. A similarity score can be measured by cosine. For example, the specific calculation can be as follows:

$$Sim\_a = cosine(P, pa)$$

$$Sim\_b = cosine(P, pb)$$

204. The electronic device searches, from a graph feature database, for a resource transfer device graph feature corresponding to the device identification, a first user graph feature corresponding to the first user, and a second user graph feature corresponding to the second user.

For example, the electronic device may specifically search, from the established graph feature database, for the resource transfer device graph feature Fsn corresponding to the device identification, the first user graph feature Fa corresponding to the first user and the second user graph feature Fb corresponding to the second user, and may also obtain the device graph feature Fsn corresponding to a device number sn from a cloud graph feature library of a cloud end, for example, as shown in FIG. 2d.

205. The electronic device calculates, according to the resource transfer device graph feature and the first user graph feature, a first resource transfer probability that the first user performs resource transfer at the resource transfer place.

For example, user A, user B and device sn are input into the graph feature database to search for the corresponding graph features Fa, Fb, and Fsn, and arrival probabilities of user A and user B can also be calculated using a cosine function. For example, the electronic device may specifically calculate a first extents of correlation between the resource transfer device graph feature and the first user graph feature, and determine, according to the first extents of correlation, the first resource transfer probability that the first user performs resource transfer at the resource transfer place. For example, it can be specifically as follows:

$$P\_a\_sn = cosine(Fa, sn) \qquad \text{First resource transfer probability:}$$

206. The electronic device calculates, according to the resource transfer device graph feature and the second user graph feature, a second resource transfer probability that the second user performs resource transfer at the resource transfer place.

For example, the electronic device may specifically calculate a second extents of correlation between the resource transfer device graph feature and the second user graph feature, and determine, according to the second extents of correlation, the second resource transfer probability that the second user performs resource transfer at the resource transfer place. For example, it can be specifically as follows:

$$P\_b\_sn = cosine(Fb, sn) \qquad \text{Second resource transfer probability:}$$

207. The electronic device generates a first fusion probability according to a first similarity between the face image feature and the first face feature, and the first resource transfer probability.

For example, the electronic device may specifically obtain a first interpolation coefficient of the first similarity between the face image feature and the first face feature and a second interpolation coefficient of the first resource transfer probability; and fuse, according to the first interpolation coefficient and the second interpolation coefficient, the similarity between the face image feature and the first face feature with the first resource transfer probability to obtain the first fusion probability. In order to improve the accuracy of fusion, a sum of the first interpolation coefficient and the second interpolation coefficient may be 1.

For example, the first fusion probability Pa (Sim_a, P_a_sn) may be calculated according to a fusion of Sim_a and P_a_sn, which may be specifically as follows:

$$Pa(Sim\_a, P\_a\_sn) = (1-w)*Sim\_a + w*P\_a\_sn$$

208. The electronic device generates a second fusion probability according to a second similarity between the face image feature and the second face feature, and the second resource transfer probability.

For example, the electronic device may specifically obtain a first interpolation coefficient of the second similarity between the face image feature and the second face feature and a second interpolation coefficient of the second resource transfer probability; and fuse, according to the first interpolation coefficient and the second interpolation coefficient, the similarity between the face image feature and the target face feature with the second resource transfer probability to obtain the second fusion probability. In order to improve the accuracy of fusion, a sum of the first interpolation coefficient and the second interpolation coefficient may be 1.

For example, the second fusion probability Pb (Sim_b, P_b_sn) may be calculated according to a fusion of Sim_b and P_b_sn, which may be specifically as follows:

$$Pb(Sim\_b, P\_b\_sn) = (1-w)*Sim\_b + w*P\_b\_sn$$

209. The electronic device determines a resource transfer verification manner of the resource transfer user according to the first fusion probability and the second fusion probability.

In some embodiments, the resource transfer verification manner refers to a level at which a user needs to perform verification during the resource transfer, and in particular may refer to how many bits of a check code a user needs to input during the resource transfer, for example, a check code a user needs to input during payment at a place of payment. For example, the electronic device may specifically obtain a maximum probability value of the first fusion probability and the second fusion probability, and determine the maximum probability value as a first measurement value; and obtain a minimum probability value of the first fusion probability and the second fusion probability, calculate a difference value between the maximum probability value and the minimum probability value, and determine the difference value as a second measurement value. If the first fusion probability and the second fusion probability satisfy two preset formulas, namely, if a first measurement value is greater than a first preset threshold and the second measurement value is greater than a second preset threshold, the resource transfer verification manner of the resource transfer user is a first verification manner. In the first verification manner, the user can complete resource transfer without typing in a check code, namely, a 0-digit verification code, and therefore, the first verification manner may also be referred to as a 0-digit verification manner. If the first fusion probability and the second fusion probability only satisfy one of two preset formulas, namely, if the first measurement value is greater than a first preset threshold or the second measurement value is greater than a second preset threshold, the resource transfer verification manner of the resource transfer user is a second verification manner. In the second verification manner, the user needs to type in an N-digit check code to complete resource transfer, where N is a positive integer, for example, N=4. If neither the first fusion probability and the second fusion probability satisfy either of two preset formulas, namely, if the first measurement value is less than or equal to a first preset threshold and the second measurement value is less than or equal to a second preset threshold, the resource transfer verification manner of the resource transfer user is a third verification manner. In the third verification manner, the user needs to type in an M-digit check code to complete resource transfer, where M is a positive integer, M>N, for example, M=11.

For example, the above-mentioned two preset formulas may be: max (Pa, Pb)>threshold1, and max (Pa, Pb)–min (Pa, Pb)>threshold2. For example, three kinds of mobile phone number-based verification modes are determined: a 0-digit manner, a 4-bit manner, and an 11-bit manner according to the above two preset formulas. If both of the two formulas are satisfied, the verification manner is the 0-digit verification manner, that is, no mobile phone number needs to be typed in. If only one formula is satisfied, four digits of a mobile phone number needs to be typed in for verification. If neither of the above-mentioned preset two formulas are satisfied, a 11-bit mobile phone number needs to be typed in for verification. The specific processes may be as shown in FIG. 2c.

The 0-digit verification manner can directly recognize a face from a hundred million-level face database without any verification of a user. The 4-digit verification manner can recognize several faces from the hundred million-level face database, and a user needs to type in the last four digits of a bound mobile phone number for confirmation. The 11-digit verification manner can be used when a user cannot be recognized, and the user is required to type in a bound 11-digit mobile phone number and be recognized.

After the above resource transfer verification manner of the resource transfer user is determined, the resource transfer verification corresponding to the resource transfer verification manner is performed, and the face recognition-based resource transfer corresponding to the resource transfer object is completed.

In this scheme, historical face scan information is abstracted into connection between a user and a store to construct an unstructured graph relation between the user and the store. Thus, a graph learning technology is used to train the user and the store by using a loss function to obtain a vectorized expression. Therefore, a probability that the user goes to the store for the face scan can be measured. A comprehensive decision is made by combining the face recognition, which makes full use of the historical face scan information, thereby greatly improving the accuracy of face recognition in face scan resource transfer and solving the problem of recognition of some highly similar faces, and thereby feeding back the face scan resource transfer to form an effective closed loop. The usage rate of the 0-digit verification manner of the face scan resource transfer is greatly increased. Users feel "safter while scanning the face."

It is known from the above that this embodiment can obtain resource transfer information initiated at a resource transfer place, the resource transfer information including a face image feature of a resource transfer object and a device identification of a resource transfer device; then search for a target face feature matching the face image feature from a face database, and determine a target object corresponding to the target face feature; search, from a graph feature database, for a resource transfer device graph feature corresponding to the device identification and a target object graph feature corresponding to the target object; calculate, according to the resource transfer device graph feature and the target object graph feature, an initial resource transfer probability that the target object performs resource transfer at the resource transfer place; generate a fused resource transfer probability according to a similarity between the face image feature and the target face feature and the initial resource transfer probability; and recognize a resource transfer verification manner of the resource transfer object according to the fused resource transfer probability.

Since a graph model of a user and a store can be constructed by making full use of information indicating that the user has conducted the face scan at the store, and structure information of the user and the store in a graph (for example, unsupervised training frames of metapath2vec and skip2 gram) is fully mined by using the graph model, this scheme can complete a similar effect of collaborative filtering. For example, many users of store A also scan the faces at store B, and there is a certain probability that remaining users of store A that do not scan the face at store B will go to store B to scan the faces. Finally, the graph model constructs a user-store probability (frequent visitors) or a user-store transition probability (new customers) by measuring user-store embedding. A comprehensive decision is made by combining the face recognition technology in a face scan resource transfer system, and the capability of recognition of face scan resource transfer is finally greatly improved.

In order to better implement the above method, an embodiment of this application also correspondingly provides a face recognition apparatus. The face recognition apparatus can be specifically integrated in an electronic device, and the electronic device may be a server, a terminal, or other devices.

Figure 3:
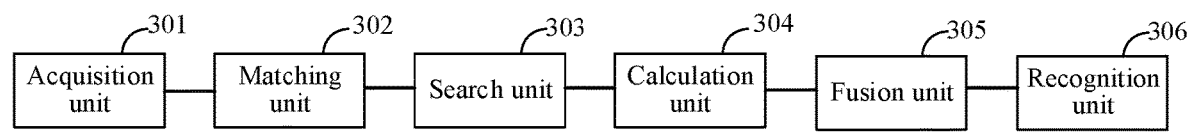
FIG. 3 is a schematic structural diagram of a face recognition apparatus provided by an embodiment of this application.

For example, as shown in FIG. 3, the face recognition apparatus may include an acquisition unit 301, a matching unit 302, a search unit 303, a calculation unit 304, a fusion unit 305, and a recognition unit 306.

The acquisition unit 301 is configured to obtain a request that is initiated at a resource transfer place and contains resource transfer information, the resource transfer information including a face image feature of a resource transfer object and a device identification of a resource transfer device.

The matching unit 302 is configured to search for a target face feature matching the face image feature from a face database, and determine a target object corresponding to the target face feature.

The search unit 303 is configured to search, from a graph feature database, for a resource transfer device graph feature corresponding to the device identification and a target object graph feature corresponding to the target object.

The calculation unit 304 is configured to calculate, according to the resource transfer device graph feature and the target object graph feature, an initial resource transfer probability that the target object performs resource transfer at the resource transfer place.

The fusion unit 305 is configured to generate a fused resource transfer probability according to a similarity between the face image feature and the target face feature and the initial resource transfer probability.

The recognition unit 306 is configured to recognize a resource transfer verification manner of the resource transfer object according to the fused resource transfer probability.

In some embodiments, the matching unit 302 may be further configured to calculate similarities between the face image feature and candidate face features in the face database and obtain the target face feature with the similarity satisfying a preset condition from the face database according to a calculation result, and determine the target object corresponding to the target face feature.

In some embodiments, the face recognition apparatus further includes a training unit, the training unit including a collection subunit, an initialization subunit, a training subunit and a storage subunit.

The collection subunit is configured to collect a plurality of training sample pairs, the training sample pairs including at least one positive sample and at least one negative sample. The initialization subunit is configured to respectively perform feature initialization on sample objects and sample devices in the training sample pairs to obtain initial object features and initial device features. The training subunit is configured to train the initial object features and the initial device features according to the positive samples and the negative samples to obtain object graph features and device graph features. The storage subunit is configured to store the object graph features and the device graph features to the graph feature database.

In some embodiments, the collection subunit may further configured to determine link relations between the sample objects and the sample devices according to a historical resource transfer record, and construct a heterogeneous network graph of the sample objects and the sample devices according to the link relations; and perform, in the heterogeneous network graph, path sampling on the sample objects and sample devices serving as nodes, all paths having the link relations between the collected nodes being used as the positive samples, and at least one path having no link relation between the collected nodes being used as the negative samples.

In some embodiments, the collection subunit may be further configured to obtain a pre-defined meta-path by taking the sample objects and the sample devices as different types of nodes, the meta-path including the link relations between the different types of nodes; calculate a transfer probability of each step according to the link relations between the different types of nodes in the meta-path, and determine a random walk sampling policy according to the transfer probability of each step; and perform, in the heterogeneous network graph, path sampling according to the random walk sampling policy.

In some embodiments, the training subunit may be further configured to calculate extents of correlation between the initial object features and the initial device features in the positive samples to obtain a predicted result of the positive samples; calculate extents of correlation between the initial object features and the initial device features in the negative samples to obtain a predicted result of the negative samples; and use a loss function to adjust the initial object features and the initial device features according to the predicted result of the positive samples, an actual result of the positive samples, the predicted result of the negative samples and an actual result of the negative samples, and obtain the object graph features and the device graph features until the loss function converges.

In some embodiments, the target face feature includes a first face feature and a second face feature, and the target object includes a first object and a second object. The matching unit 302 may be further configured to rank the similarities between the face image features and the candidate face features according to the calculation result; obtain, from the ranking according to a ranking result, the first face feature corresponding to a first similarity and the second face feature corresponding to a second similarity; and determine the first face feature and the second face feature as the target face feature, and determine the first object corresponding to the first face feature and the second object corresponding to the second face feature.

The search unit 303 may be further configured to search, from the graph feature database, for the resource transfer device graph feature corresponding to the device identification, a first object graph feature corresponding to the first object, and a second object graph feature corresponding to the second object.

In some embodiments, the initial resource transfer probability includes a first resource transfer probability and a second resource transfer probability. The calculation unit 304 may be further configured to calculate, according to the resource transfer device graph feature and the first object graph feature, the first resource transfer probability that the first object performs the resource transfer at the resource transfer place, and calculate, according to the resource transfer device graph feature and the second object graph feature, the second resource transfer probability that the second object performs the resource transfer at the resource transfer place.

The fusion unit 305 may be further configured to generate a first fusion probability according to the first similarity and the first resource transfer probability, and generate a second fusion probability according to the second similarity and the second resource transfer probability.

In some embodiments, the recognition unit 306 may be further configured to obtain a maximum probability value of the first fusion probability and the second fusion probability, and determine the maximum probability value as a first measurement value; obtain a minimum probability value of the first fusion probability and the second fusion probability; calculate a difference value between the maximum probability value and the minimum probability value, and determine the difference value as a second measurement value; determine, when the first measurement value is greater than a first preset threshold and the second measurement value is greater than a second preset threshold, that a resource transfer verification manner of the resource transfer object is a first verification manner; determine, when the first measurement value is greater than a first preset threshold or the second measurement value is greater than a second preset threshold, that a resource transfer verification manner of the resource transfer object is a second verification manner; and determine, when the first measurement value is less than or equal to a first preset threshold and the second measurement value is less than or equal to a second preset threshold, that a resource transfer verification manner of the resource transfer object is a third verification manner.

In some embodiments, the calculation unit 304 may be further configured to calculate the extents of correlation between the resource transfer device graph feature and the target object graph feature may be calculated; and determine, according to the extents of correlation, the initial resource transfer probability that the target object performs resource transfer at the resource transfer place.

In some embodiments, the fusion unit 305 may be further configured to obtain a first interpolation coefficient of the similarity between the face image feature and the target face feature and a second interpolation coefficient of the initial resource transfer probability; and fuse the similarity between the face image feature and the target face feature with the initial resource transfer probability according to the first interpolation coefficient and the second interpolation coefficient to obtain the fused resource transfer probability.

During specific implementation, the foregoing units may be implemented as independent entities, or may be combined arbitrarily and implemented as the same entity or a plurality of entities. For specific implementation of the foregoing units, reference can be made to the foregoing method embodiments, so the details are not described herein again.

It is known from the above that this embodiment can obtain, by the acquisition unit 301, resource transfer information initiated at a resource transfer place, the resource transfer information including a face image feature of a resource transfer object and a device identification of a resource transfer device; then search, by the matching unit 302, for a target face feature matching the face image feature from a face database, and determine a target object corresponding to the target face feature; search, by the search unit 303 from a graph feature database, for a resource transfer device graph feature corresponding to the device identification and a target object graph feature corresponding to the target object; calculate, by the calculation unit 304 according to the resource transfer device graph feature and the target object graph feature, an initial resource transfer probability that the target object performs resource transfer at the resource transfer place; generate, by the fusion unit 305, a fused resource transfer probability according to a similarity between the face image feature and the target face feature and the initial resource transfer probability; and recognize, by the recognition unit 306, a resource transfer verification manner of the resource transfer object according to the fused resource transfer probability.

By making full use of the information about resource transfer between an object and a device in a historical resource transfer record, that is, the face image feature of the resource transfer object and the device identification of the resource transfer device in the historical record of the resource transfer performed through face recognition, constructing a heterogeneous network graph of the object and the device, and fully mining structure information of the object and the device in the heterogeneous network graph, this scheme can achieve a similar effect of collaborative filtering. Finally, a graph model constructs a probability that the object uses the device to perform the resource transfer or a transfer probability between the object and the device through measurements of the object features and the device features. A comprehensive decision is made by combining the face recognition technology in the face recognition apparatus to improve a proportion of a 0-bit verification manner in the resource transfer performed by using the face scan, and improve the accuracy of transferring resources by using the face scan. The problem of recognition of some highly similar faces can be solved. Convenience of transferring resources by resource transfer objects can be improved, thereby feeding the resource transfer performed by using the face scan to form an effective closed loop and improve a user experience.

The term "module" (and other similar terms such as unit, submodule, subunit, etc.) refers to computing software, firmware, hardware, and/or various combinations thereof. At a minimum, however, modules are not to be interpreted as software that is not implemented on hardware, firmware, or recorded on a non-transitory processor readable storage medium. Indeed "module" is to be interpreted to include at least some physical, non-transitory hardware such as a part of a processor, circuitry, computer, or memory. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices. The modules can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The modules can also be implemented in hardware using processors or circuitry.

Figure 4:
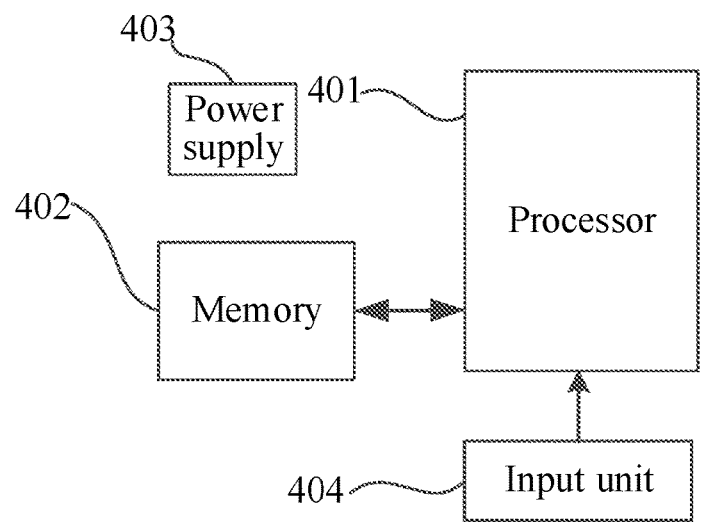
FIG. 4 is a schematic structural diagram of an electronic device provided by an embodiment of this application.

In addition, an embodiment of this application also provides an electronic device, as shown in FIG. 4, which shows a schematic structural diagram of the electronic device according to this embodiment of this application.

Specifically, the electronic device may include components such as a processor 401 with one or more processing cores, a memory 402 with one or more computer-readable storage media, a power supply 403, and an input unit 404. A person skilled in the art may understand that the electronic device structure shown in FIG. 4 does not constitute a limit to the electronic device. The server may include more or fewer parts than those shown in the figure, may combine some parts, or may have different part arrangements.

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. In some embodiments, the processor 401 may include the one or more processing cores. In some embodiments, the processor 401 may integrate an application processor and a modem processor. The application processor mainly processes an operating system, a UI, an application program, and the like. The modem processor mainly processes wireless communication. It may be understood that the modem processor may either not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application program required by at least one function (such as a sound playback function and an image display function), and the like. The data storage area may store data created according to use of the electronic device, and the like. In addition, the memory 402 may include a high speed RAM, and may further include a non-volatile memory, such as at least one magnetic disk storage device, a flash memory, or another volatile solid storage device. Correspondingly, the memory 402 may further include a memory controller, so that the processor 401 can access the memory 402.

The electronic device also includes a power supply 403 configured to supply power for the various components. In some embodiments, the power supply 403 may be logically coupled to the processor 401 through a power management system to realize functions of managing charging, discharging and power consumption and the like. The power supply 403 may further include one or more direct current or alternating current power supplies, a re-charging system, a power failure detection circuit, a power supply converter or inverter, a power supply state indicator, and any other component.

The electronic device may further include the input unit 404. The input unit 404 may be configured to receive inputted numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 401 of the electronic device may load, according to the following instructions, executable files corresponding to processes of one or more application programs into the memory 402. The processor 401 runs the application programs stored in the memory 402, to implement the various functions as follows:

obtaining resource transfer information initiated at a resource transfer place, the resource transfer information including a face image feature of a resource transfer object and a device identification of a resource transfer device; then searching for a target face feature matching the face image feature from a face database, and determining a target object corresponding to the target face feature; searching, from a graph feature database, for a resource transfer device graph feature corresponding to the device identification and a target object graph feature corresponding to the target object; calculating, according to the resource transfer device graph feature and the target object graph feature, an initial resource transfer probability that the target object performs resource transfer at the resource transfer place; generating a fused resource transfer probability according to a similarity between the face image feature and the target face feature and the initial resource transfer probability; and recognizing a resource transfer verification manner of the resource transfer object according to the fused resource transfer probability.

Specific implementations of the above operations can be found in the previous embodiments and will not be described in detail herein.

It is known from the above that this embodiment can obtain resource transfer information initiated at a resource transfer place, the resource transfer information including a face image feature of a resource transfer object and a device identification of a resource transfer device; then search for a target face feature matching the face image feature from a face database, and determine a target object corresponding to the target face feature; search, from a graph feature database, for a resource transfer device graph feature corresponding to the device identification and a target object graph feature corresponding to the target object; calculate, according to the resource transfer device graph feature and the target object graph feature, an initial resource transfer probability that the target object performs resource transfer at the resource transfer place; generate a fused resource transfer probability according to a similarity between the face image feature and the target face feature and the initial resource transfer probability; and recognize a resource transfer verification manner of the resource transfer object according to the fused resource transfer probability.

By making full use of the information about resource transfer between an object and a device in a historical resource transfer record, that is, the face image feature of the resource transfer object and the device identification of the resource transfer device in the historical record of the resource transfer performed through face recognition, constructing a heterogeneous network graph of the object and the device, and fully mining structure information of the object and the device in the heterogeneous network graph, this scheme can achieve a similar effect of collaborative filtering. Finally, a graph model constructs a probability that the object uses the device to perform the resource transfer or a transfer probability between the object and the device through measurements of the object features and the device features. A comprehensive decision is made by combining the face recognition technology in the face recognition apparatus to improve a proportion of a 0-bit verification manner in the resource transfer performed by using the face scan, and improve the accuracy of transferring resources by using the face scan. The problem of recognition of some highly similar faces can be solved, and convenience of transferring resources by resource transfer objects can be improved, thereby feeding the resource transfer performed by using the face scan to form an effective closed loop and improve a user experience.

A person of ordinary skill in the art may understand that, all or some steps of various methods in the embodiments may be implemented through instructions, or implemented through instructions controlling relevant hardware, and the instructions may be stored in a computer-readable storage medium and loaded and executed by a processor.

To this end, an embodiment of this application also provides a storage medium storing a plurality of instructions that can be loaded by a processor to perform the steps in any of the face recognition methods provided by the embodiments of this application. For example, the instructions may perform the following steps:

obtaining resource transfer information initiated at a resource transfer place, the resource transfer information including a face image feature of a resource transfer object and a device identification of a resource transfer device; then searching for a target face feature matching the face image feature from a face database, and determining a target object corresponding to the target face feature; searching, from a graph feature database, for a resource transfer device graph feature corresponding to the device identification and a target object graph feature corresponding to the target object; calculating, according to the resource transfer device graph feature and the target object graph feature, an initial resource transfer probability that the target object performs resource transfer at the resource transfer place; generating a fused resource transfer probability according to a similarity between the face image feature and the target face feature and the initial resource transfer probability; and recognizing a resource transfer verification manner of the resource transfer object according to the fused resource transfer probability.

Specific implementations of the above operations can be found in the previous embodiments and will not be described in detail herein.

The storage medium may include: a read-only memory (ROM), a random access memory (RAM), a magnetic disk, an optical disc or the like.

Since the instructions stored in the storage medium can perform the steps in any one of the face recognition methods provided in the embodiments of this application, the advantageous effects that can be achieved by any one of the face recognition methods provided in the embodiments of this application can be achieved, which are described in detail in the preceding embodiments and will not be described in detail herein.

The face recognition method and apparatus, the electronic device and the storage medium provided by the embodiments of this application have been described in detail above. Specific examples are used herein to illustrate the principles and implementations of this application. The description of the above embodiments is only used to help understand the method of this application and its core idea. In addition, those skilled in the art will make changes to all specific implementations and application ranges according to the idea of this application. In conclusion, the content of this specification shall not be understood as a limitation to this application.

What is claimed is:

1. A face recognition method, comprising:
    obtaining a request that is initiated at a resource transfer place and contains resource transfer information, the resource transfer information comprising a face image feature of a resource transfer object and a device identification of a resource transfer device;
    searching for a target face feature matching the face image feature from a face database, a target object corresponding to the target face feature;
    searching, from a graph feature database, for a resource transfer device graph feature and a target object graph feature, the resource transfer device graph feature corresponding to the device identification and the target object graph feature corresponding to the target object;
    determining, according to the resource transfer device graph feature and the target object graph feature, an initial resource transfer probability of the target object performing resource transfer at the resource transfer place;
    generating a fused resource transfer probability according to the initial resource transfer probability and a similarity between the face image feature and the target face feature; and
    determining a resource transfer verification manner of the resource transfer object according to the fused resource transfer probability.

2. The method according to claim 1, wherein searching for the target face feature matching the face image feature from the face database comprises:
    calculating similarities between the face image feature and candidate face features in the face database; and
    obtaining, according to a calculation result, the target face feature with the similarity satisfying a preset condition from the face database.

3. The method according to claim 1, before searching for the resource transfer device graph feature and the target object graph feature, further comprising:
    collecting a plurality of training sample pairs, the training sample pairs comprising at least one positive sample and at least one negative sample;
    respectively performing feature initialization on sample objects and sample devices in the training sample pairs to obtain initial object features and initial device features;
    training the initial object features and the initial device features according to the positive samples and the negative samples to obtain object graph features and device graph features; and
    storing the object graph features and the device graph features to the graph feature database.

4. The method according to claim 3, wherein collecting the plurality of training sample pairs comprises:
    determining link relations between the sample objects and the sample devices according to a historical resource transfer record;
    constructing a heterogeneous network graph of the sample objects and the sample devices according to the link relations; and
    performing, in the heterogeneous network graph, path sampling on the sample objects and sample devices serving as nodes, all paths having the link relations between the collected nodes being used as the positive samples and at least one path having no link relation between the collected nodes being used as the negative samples.

5. The method according to claim 4, wherein performing path sampling on the sample objects and sample devices serving as nodes comprises:
obtaining a pre-defined meta-path by taking the sample objects and the sample devices as different types of nodes, the meta-path comprising the link relations between the different types of nodes;
calculating a transfer probability of each step according to the link relations between the different types of nodes in the meta-path, and determining a random walk sampling policy according to the transfer probability of each step; and
performing, in the heterogeneous network graph, path sampling according to the random walk sampling policy.

6. The method according to claim 3, wherein the training the initial object features and the initial device features according to the positive samples and the negative samples to obtain object graph features and device graph features comprises:
calculating extents of correlation between the initial object features and the initial device features in the positive samples to obtain a predicted result of the positive samples;
calculating extents of correlation between the initial object features and the initial device features in the negative samples to obtain a predicted result of the negative samples; and
using a loss function to adjust the initial object features and the initial device features according to the predicted result of the positive samples, an actual result of the positive samples, the predicted result of the negative samples and an actual result of the negative samples, and obtaining the object graph features and the device graph features until the loss function converges.

7. The method according to claim 2, wherein
the target face feature comprises a first face feature and a second face feature;
the target object comprises a first object and a second object; and
obtaining the target face feature with the similarity satisfying the preset condition from the face database comprises:
ranking the similarities between the face image features and the candidate face features according to the calculation result;
obtaining, from the candidate face features according to a ranking result of the similarities, the first face feature corresponding to a first similarity and the second face feature corresponding to a second similarity; and
determining the first face feature and the second face feature as the target face feature;
determining the first object corresponding to the first face feature and the second object corresponding to the second face feature; and
searching for a resource transfer device graph feature and a target object graph feature comprises: searching for the resource transfer device graph feature corresponding to the device identification, a first object graph feature corresponding to the first object, and a second object graph feature corresponding to the second object.

8. The method according to claim 7, wherein the initial resource transfer probability comprises a first resource transfer probability and a second resource transfer probability; and the determining, according to the resource transfer device graph feature and the target object graph feature, the initial resource transfer probability that the target object performs resource transfer at the resource transfer place comprises:
determining, according to the resource transfer device graph feature and the first object graph feature, the first resource transfer probability that the first object performs resource transfer at the resource transfer place; and
determining, according to the resource transfer device graph feature and the second object graph feature, the second resource transfer probability that the second object performs resource transfer at the resource transfer place; and
generating the fused resource transfer probability according to the similarity between the face image feature and the target face feature and the initial resource transfer probability comprises: generating a first fusion probability according to the first similarity and the first resource transfer probability, and generating a second fusion probability according to the second similarity and the second resource transfer probability.

9. The method according to claim 8, wherein determining the resource transfer verification manner of the resource transfer object according to the fused resource transfer probability comprises:
obtaining a maximum probability value of the first fusion probability and the second fusion probability, and determining the maximum probability value as a first measurement value;
obtaining a minimum probability value of the first fusion probability and the second fusion probability;
calculating a difference value between the maximum probability value and the minimum probability value to determine the difference value as a second measurement value; and
determining: when
when the first measurement value is greater than a first preset threshold and the second measurement value is greater than a second preset threshold, that the resource transfer verification manner of the resource transfer object is a first verification manner;
when the first measurement value is greater than a first preset threshold or the second measurement value is greater than a second preset threshold, that the resource transfer verification manner of the resource transfer object is a second verification manner; or
when the first measurement value is less than or equal to a first preset threshold and the second measurement value is less than or equal to a second preset threshold, that the resource transfer verification manner of the resource transfer object is a third verification manner.

10. The method according to claim 1, wherein determining, according to the resource transfer device graph feature and the target object graph feature, the initial resource transfer probability of the target object performs resource transfer at the resource transfer place comprises:
calculating a extents of correlation between the resource transfer device graph feature and the target object graph feature; and determining, according to the extents of correlation, the initial resource transfer probability that the target object performs resource transfer at the resource transfer place.

11. The method according to claim 1, wherein generating the fused resource transfer probability comprises:
obtaining a first interpolation coefficient of the similarity between the face image feature and the target face feature, and a second interpolation coefficient of the initial resource transfer probability; and
fusing the similarity between the face image feature and the target face feature with the initial resource transfer probability according to the first interpolation coefficient and the second interpolation coefficient to obtain the fused resource transfer probability.

12. A non-transitory computer-readable storage medium, storing a plurality of instructions adapted to be loaded by a processor to perform the steps comprising:
obtaining a request that is initiated at a resource transfer place and contains resource transfer information, the resource transfer information comprising a face image feature of a resource transfer object and a device identification of a resource transfer device;
searching for a target face feature matching the face image feature from a face database, a target object corresponding to the target face feature;
searching, from a graph feature database, for a resource transfer device graph feature and a target object graph feature, the resource transfer device graph feature corresponding to the device identification and the target object graph feature corresponding to the target object;
determining, according to the resource transfer device graph feature and the target object graph feature, an initial resource transfer probability of the target object performing resource transfer at the resource transfer place;
generating a fused resource transfer probability according to the initial resource transfer probability and a similarity between the face image feature and the target face feature; and
determining a resource transfer verification manner of the resource transfer object according to the fused resource transfer probability.

13. The non-transitory computer-readable storage medium of claim 12, wherein the plurality of instructions are adapted to be loaded by the processor to search for the target face feature matching the face image feature from the face database by:
calculating similarities between the face image feature and candidate face features in the face database; and
obtaining, according to a calculation result, the target face feature with the similarity satisfying a preset condition from the face database.

14. The non-transitory computer-readable storage medium of claim 12, wherein the plurality of instructions are adapted to be loaded by the processor to perform:
collecting a plurality of training sample pairs, the training sample pairs comprising at least one positive sample and at least one negative sample;
respectively performing feature initialization on sample objects and sample devices in the training sample pairs to obtain initial object features and initial device features;
training the initial object features and the initial device features according to the positive samples and the negative samples to obtain object graph features and device graph features; and
storing the object graph features and the device graph features to the graph feature database.

15. The non-transitory computer-readable storage medium of claim 12, wherein the plurality of instructions are adapted to be loaded by the processor to determine, according to the resource transfer device graph feature and the target object graph feature, the initial resource transfer probability of the target object performs resource transfer at the resource transfer place by:
calculating a extents of correlation between the resource transfer device graph feature and the target object graph feature; and
determining, according to the extents of correlation, the initial resource transfer probability that the target object performs resource transfer at the resource transfer place.

16. An electronic device, comprising:
a memory, storing a computer program; and
at least one processor, configured to execute the program to perform steps comprising:
obtaining a request that is initiated at a resource transfer place and contains resource transfer information, the resource transfer information comprising a face image feature of a resource transfer object and a device identification of a resource transfer device;
searching for a target face feature matching the face image feature from a face database, a target object corresponding to the target face feature;
searching, from a graph feature database, for a resource transfer device graph feature and a target object graph feature, the resource transfer device graph feature corresponding to the device identification and the target object graph feature corresponding to the target object;
determining, according to the resource transfer device graph feature and the target object graph feature, an initial resource transfer probability of the target object performing resource transfer at the resource transfer place;
generating a fused resource transfer probability according to the initial resource transfer probability and a similarity between the face image feature and the target face feature; and
determining a resource transfer verification manner of the resource transfer object according to the fused resource transfer probability.

17. The electronic device of claim 16, wherein the at least one processor is configured to execute the program to search for the target face feature matching the face image feature from the face database by:
calculating similarities between the face image feature and candidate face features in the face database; and
obtaining, according to a calculation result, the target face feature with the similarity satisfying a preset condition from the face database.

18. The electronic device of claim 16, wherein the at least one processor is further configured to execute the program to perform steps comprising:
collecting a plurality of training sample pairs, the training sample pairs comprising at least one positive sample and at least one negative sample;
respectively performing feature initialization on sample objects and sample devices in the training sample pairs to obtain initial object features and initial device features;

training the initial object features and the initial device features according to the positive samples and the negative samples to obtain object graph features and device graph features; and storing the object graph features and the device graph features to the graph feature database.

19. The electronic device of claim 16, wherein the at least one processor is configured to execute the program to determine, according to the resource transfer device graph feature and the target object graph feature, the initial resource transfer probability of the target object performs resource transfer at the resource transfer place by:

calculating a extents of correlation between the resource transfer device graph feature and the target object graph feature; and determining, according to the extents of correlation, the initial resource transfer probability that the target object performs resource transfer at the resource transfer place.

20. The electronic device of claim 16, wherein the at least one processor is configured to execute the program to generate the fused resource transfer probability by:

obtaining a first interpolation coefficient of the similarity between the face image feature and the target face feature, and a second interpolation coefficient of the initial resource transfer probability; and fusing the similarity between the face image feature and the target face feature with the initial resource transfer probability according to the first interpolation coefficient and the second interpolation coefficient to obtain the fused resource transfer probability.

\* \* \* \* \*